United States Patent
Hill et al.

(10) Patent No.: US 6,272,450 B1
(45) Date of Patent: *Aug. 7, 2001

(54) CELLULAR NETWORK TRAFFIC SIMULATOR (CENTS)

(75) Inventors: Tommy Hill, Montreal; Daniel Lemay, St-Calixte; Daniel Beaulieu, Greenfield Park, all of (CA); Andre Walter, Herzogenrath (DE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,067

(22) Filed: Jun. 16, 1998

(51) Int. Cl.$^7$ ............................................ G06F 17/50
(52) U.S. Cl. .................. 703/13; 703/22; 370/241; 370/356; 370/319; 455/67.1
(58) Field of Search ...................... 703/13, 16, 22, 703/5; 370/319, 356, 241; 455/67.1, 65, 437

(56) References Cited

U.S. PATENT DOCUMENTS

| | | | |
|---|---|---|---|
| 4,255,624 | 3/1981 | Walton et al. | 179/175.2 D |
| 4,255,625 | 3/1981 | Walton et al. | 179/175.2 D |
| 4,314,110 | 2/1982 | Breidenstein et al. | 179/175.2 R |
| 4,631,363 | 12/1986 | Foster et al. | 379/15 |
| 4,680,784 | 7/1987 | Lehnert et al. | 379/11 |
| 4,852,144 | 7/1989 | Cole | 379/11 |
| 4,910,729 | 3/1990 | Coffelt et al. | 370/17 |
| 5,359,649 * | 10/1994 | Rosu et al. | 379/320 |
| 5,465,393 | 11/1995 | Frostrom et al. | 455/54.1 |
| 5,471,649 | 11/1995 | Rees et al. | 455/67.4 |
| 5,627,834 | 5/1997 | Han et al. | 370/241 |
| 5,740,164 * | 4/1998 | Liron | 370/316 |
| 5,794,128 * | 8/1998 | Brockel et al. | 455/67.1 |
| 6,014,565 * | 1/2000 | Bonta | 455/437 |
| 6,058,260 * | 5/2000 | Brockel et al. | 395/500.25 |

OTHER PUBLICATIONS

Cvetkovski et al., "A Simulation of a Mobile Traffic," IEEE, 1997, pp. 409–413.*

Makoto Aihara, Shouju Tanaka, Seitarou Akita, and Kazuaki Sakai; "Development of Radio Simulator"; NEC Research and Development, No. 90; Jul. 1, 1988, pp. 99–105.

* cited by examiner

Primary Examiner—Kevin J. Teska
Assistant Examiner—Thai Phan
(74) Attorney, Agent, or Firm—Smith, Danamraj & Youst, P.C.

(57) ABSTRACT

A traffic simulator for a cellular radio telecommunications network. The traffic simulator includes a function handler which generates a plurality of basic call functions performed by mobile stations (MSs) over an air interface link with the network. A sequence handler utilizes the basic functions to generate a plurality of call sequences, and a traffic mix handler utilizes the plurality of call sequences to generate an overall traffic mix. A MS handler includes a plurality of MS state machines for different types of MSs and a database of MS properties. The MS handler interfaces with the basic functions to generate realistic inputs to the sequence handler. A cells handler includes a database of cells in the network and parameters relating to radio conditions. The cells handler also interfaces with the basic functions to generate realistic inputs to the sequence handler. A traffic repository may inject recorded real mobile station traffic into the traffic mix. A connection manager sends the traffic mix to external network components, and a graphical user interface (GUI) enables an operator to interface with the traffic simulator and generate specified traffic scenarios.

20 Claims, 11 Drawing Sheets

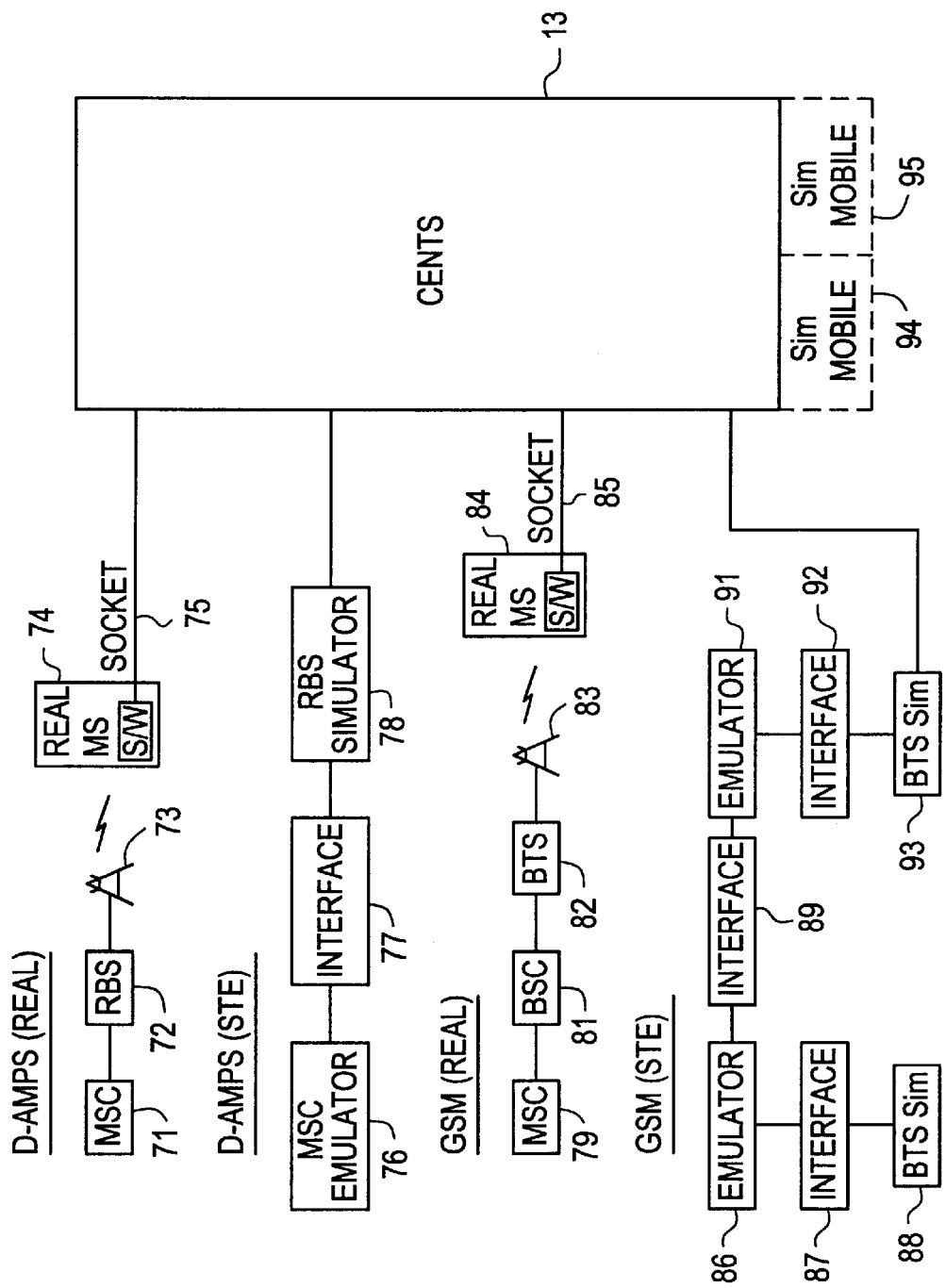

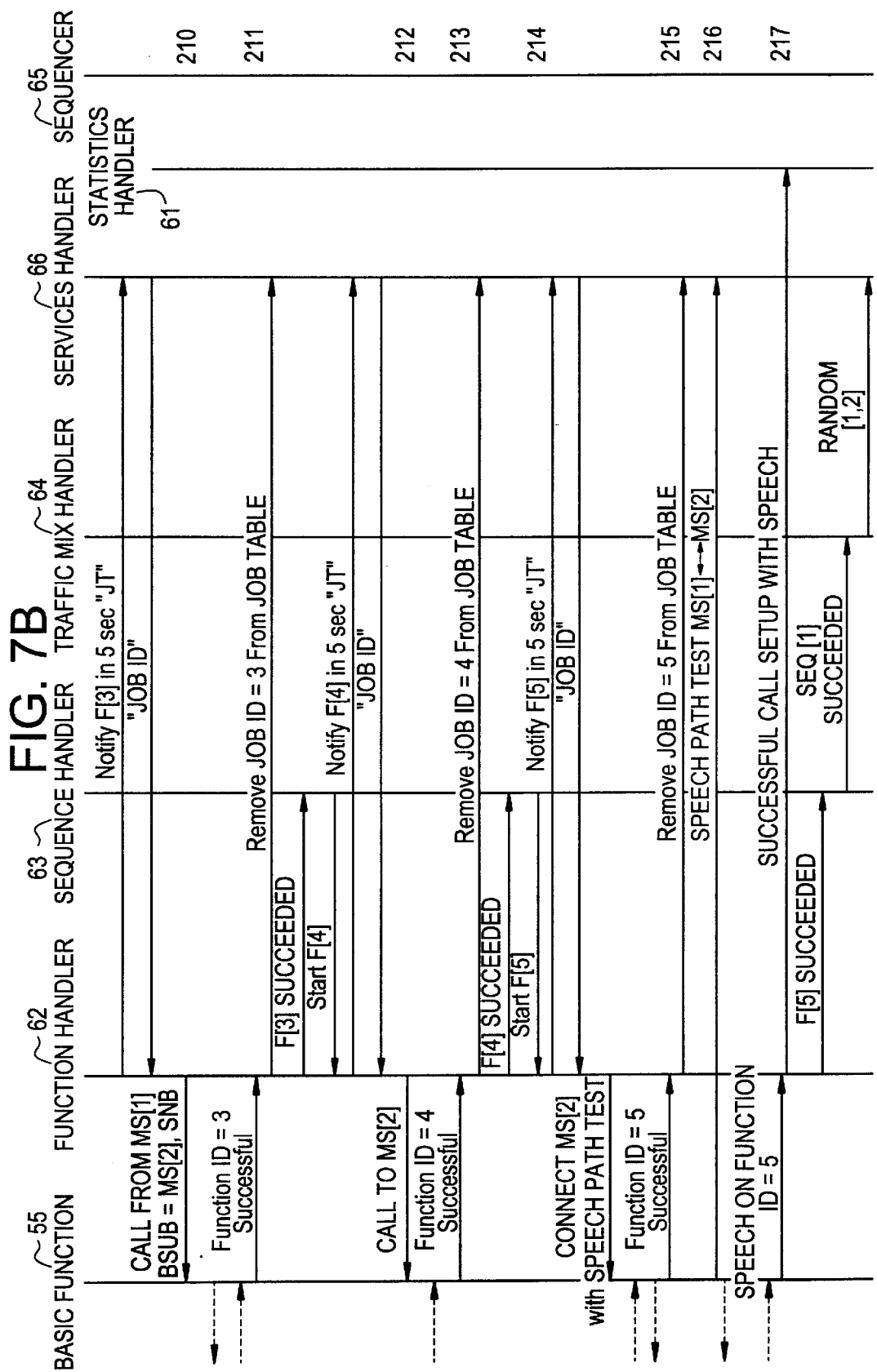

CELLULAR NETWORK TRAFFIC SIMULATOR (CENTS)

BACKGROUND OF THE INVENTION

1. Technical Field of the Invention

This invention relates to telecommunications networks and, more particularly, to a system and method of simulating the traffic load in a cellular radio telecommunications network.

2. Description of Related Art

In existing cellular telecommunications networks, realistic testing of new, high capacity mobile switching nodes is limited by the realism of the simulated traffic loads that are imposed on the cellular networks during the early testing phases. Generally, only a few base stations are connected, and a low level of traffic is injected into the cellular network. This makes it difficult to discover system problems which may develop under heavier traffic conditions prior to testing under real-world conditions.

Existing traffic-load simulators execute on application specific hardware, and are programmed in application specific language/scripts. Traffic is generated by executing different scripts/programs, each of which simulates a different traffic case. In order to simulate increased traffic, the existing scripts/programs must be updated, or new scripts/programs must be written to simulate additional switch hardware and mobile stations. In addition, each traffic-load simulator executes independently with no overall network coordination. Thus, there is no possibility of load sharing by means of distributing subprocesses on different target machines.

Extensive efforts have been made to resolve this situation, but existing traffic-load simulators are still not able to reproduce a load that closely resembles the real-world load experienced by MSCs in actual network operation. Therefore, the existing test environment is useful mainly for design and function testing of specific nodes, but is severely limited when it comes to multi-node testing, system testing, or mapping of customer networks. Some traffic scenarios are not currently reproducible, or are unreliable in today's environment. In addition, the existing methods of simulating cellular traffic loads all require massive amounts of hardware and maintenance, and do not provide a user-friendly interface.

Although there are no known prior art teachings of a solution to the aforementioned deficiency and shortcoming such as that disclosed herein, U.S. Pat. No. 4,680,784 to Lehnert et al. discusses subject matter that bears some relation to matters discussed herein. Lehnert discloses a traffic simulator for testing telecommunication exchanges which imitates the behavior of subscribers and lines connected to the exchange. The instantaneous behavior of the subscriber and line simulations are not predetermined, but adapt themselves randomly to system reactions. The traffic simulator includes a circuit for producing the subscriber and line simulations, a circuit for determining event instants, a circuit for producing random event variables, an interface for transmitting absolute simulation instants to the exchange, and a simulation control to which the exchange transfers reports of received events. The reaction times of the exchange can then be measured without measuring the internal time delays of the simulator.

Lehnert, however, has several disadvantages. First, the Lehnert simulator is designed for wireline telecommunication switches, and therefore, does not account for many conditions encountered in cellular systems which change the traffic load parameters and affect switch performance. For example, Lehnert does not address radio propagation conditions, signal strength from mobile stations, bit error rates on uplink and downlink channels, etc. Cellular switches have to measure all these conditions for each mobile station and determine when to hand off the mobile station from its serving cell to a neighboring cell in which the radio conditions are better. Additionally, the Lehnert simulator is hardware dependent, and is programmed in application specific scripts. Thus, to simulate increased traffic, the existing scripts must be updated, or new scripts must be written. Finally, the Lehnert simulator simulates subscriber behavior such as lifting the receiver, flashing the hook switch, dialing certain numbers, etc. It does not simulate differing mobile station capabilities and/or radio conditions. Therefore, Lehnert reveals no disclosure or suggestion of a cellular network traffic simulator such as that described and claimed herein.

In order to overcome the disadvantage of existing solutions, it would be advantageous to have a cellular network traffic simulator that is not hardware dependent, and accounts for standardized call routines conducted over the air interface, differing mobile station capabilities, differing radio conditions, and differing call scenarios as mobile stations roam throughout the service area of the cellular network. Such a simulator would be able to simulate a realistic traffic load that closely resembles the real-world traffic load experienced within a cellular network. Utilizing the simulator during the early testing phases of MSCs would result in more robust systems that would be significantly less likely to fail when experiencing real-world traffic conditions. The present invention provides such a traffic simulator.

SUMMARY OF THE INVENTION

In one aspect, the present invention is a traffic simulator for a cellular radio telecommunications network comprising a function handler which initiates execution of a plurality of basic functions performed by mobile stations over an air interface link with the network, a sequence handler which utilizes the basic functions to generate a plurality of call sequences, and a traffic mix handler which utilizes the plurality of call sequences to generate an overall traffic mix. The simulator also includes a mobile station handler which interfaces with the basic functions and comprises a plurality of mobile station state machines for different types of mobile stations, and a database of mobile station properties. Additionally, the simulator may include a cells handler which interfaces with the basic functions and comprises a database of cells in the network, and parameters relating to radio conditions. Other components may include a traffic repository of recorded real mobile station traffic which may be injected into the traffic mix, a connection manager which interfaces the traffic simulator with external network components, and a graphical user interface (GUI) which enables an operator to interface with the traffic simulator and generate specified traffic scenarios.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 4 is a simplified block diagram illustrating a plurality of external network configurations which may be tested with traffic generated by the CENTS system;

FIGS. 7A–7C are a message flow diagram illustrating the steps involved when the present invention automatically generates a traffic mix of MS-to-MS calls.

DETAILED DESCRIPTION OF EMBODIMENTS

The present invention is a Cellular Network Traffic-load Simulator (CENTS) that supports generation of high levels of cellular traffic on multiple MSC's through a User-defined number of mobile stations. The CENTS system simulates actual traffic as it would appear in a cellular network over the air interface. The tool simulates the mobile station side of the air interface, and therefore is generic and can be used with any cellular network. In GSM, the CENTS system connects to the Base Station Controller (BSC). Different traffic patterns may be generated by changing traffic parameters within the CENTS system. This parameter-driven traffic generation increases the ability to reuse code when increasing traffic load. This also makes it possible to automatically generate a traffic mix based on, for example, actual traffic samples/recordings taken from customer networks, thereby reducing the need for time-consuming script/program updating.

CENTS includes a graphical user interface that supports:
1) Basic functions such as registration, originating call access etc.
2) The grouping of user defined basic functions into user defined sequences, e.g. MS1 registration, MS2 registration, MS1 originating call access etc.
3) The grouping of user defined sequences into a traffic mix that can be launched with a user defined frequency and content at a user defined time.
4) Data base handling for easy configuration and setup.
5) User unique data base that can be exported, imported and shared between users.
6) Graphical presentation of statistical functions for monitoring load and test progress.
7) Graphical monitoring of traffic on a MS level.

Figure 1:
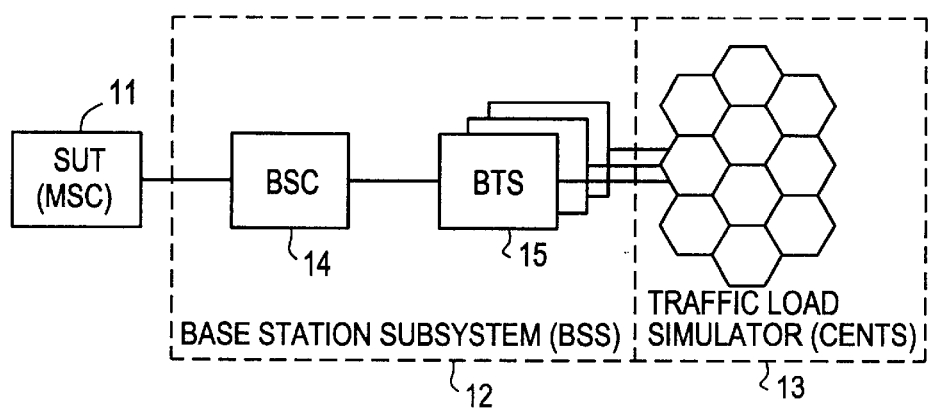
FIG. 1 is a block diagram of a typical testing configuration utilized to test a mobile switching center (MSC)

FIG. 1 is a block diagram of a typical testing configuration utilized to test a System Under Test (SUT) 11 such as a Mobile Switching Center (MSC). The MSC is connected to a Base Station Subsystem (BSS) 12 and the CENTS traffic load simulator 13. The GSM BSS includes a base station controller (BSC) 14 and a plurality of Base Transceiver Stations (BTSs) 15. Either the MSC 11 or the BSS 12 may be real telecommunications nodes or simulated nodes.

Different versions of the CENTS system simulate the traffic functionality of different telecommunications network specifications. For example, one version of the present invention simulates the traffic functionality of the BSS and the MS in the GSM system. The GSM specification is hereby incorporated by reference herein. The CENTS 13 is then used for testing and maintaining GSM software, and for training purposes to provide a better understanding of the GSM functionality on the node and system level. CENTS may be built on a UNIX platform, thereby enabling any manufacturer to utilize the simulator, with only minor modifications, for Abis interface simulation. Abis is the interface between the BSC 14 and the BTS 15 in the GSM BSS 12 (GSM 04.04 & 08.58).

CENTS 13 simulates the Abis interface and the MS states according to the GSM standard. All cell information (System Information 1–12, GSM 04.08) that the MS needs to operate is downloaded from the BSC 14. The simulation of the GSM mobile station includes a virtual SIM card 35a (see FIG. 2) which can be plugged into the mobile station to provide subscriber information.

With the ability to simulate network traffic loads, a real network can be mapped into a simulated test environment (STE). This network STE may be utilized for test and maintenance at the node or system level, for raining purposes and competency testing, and for verification of interfaces with service nodes, network suppliers, or other telecommunication networks. The network STE utilizes emulated nodes to the maximum extent possible, and employs the CENTS traffic load simulator with its user-friendly GUI.

Figure 2:
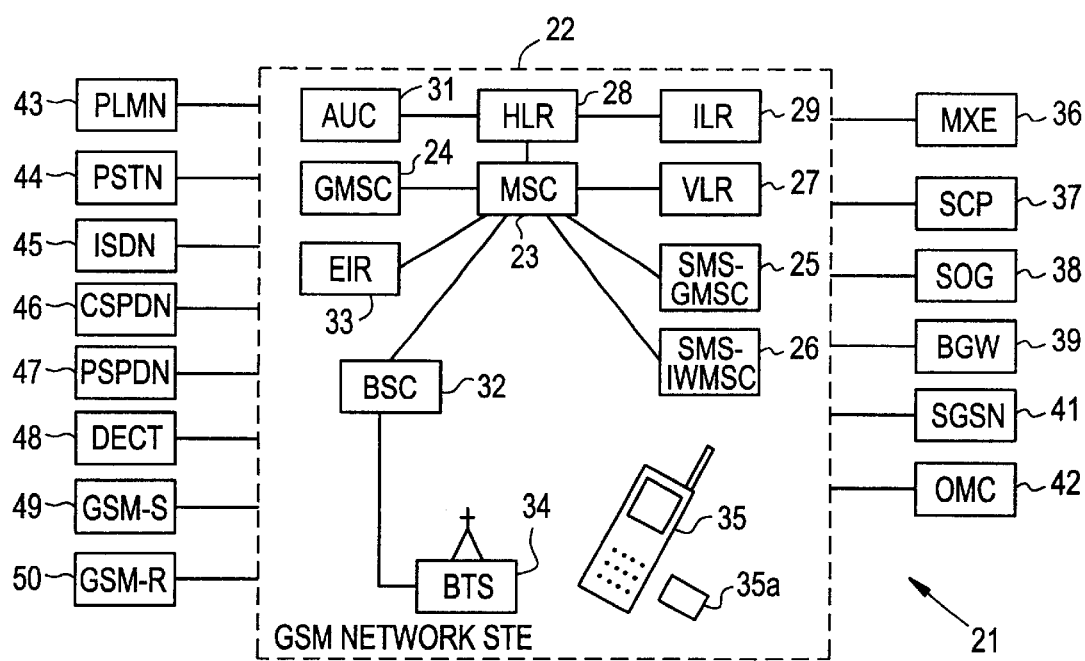
FIG. 2 is a simplified block diagram of a Global System for Mobile Communications (GSM) network implemented in a GSM network Simulated Test Environment (STE)

FIG. 2 is a simplified block diagram of a GSM network 21 implemented in a GSM network Simulated Test Environment (GSM STE) 22. The GSM STE 22 simulates the GSM Switching System (SS) and Base Station Subsystem (BSS), and includes emulations of the following network nodes: Mobile Switching Center (MSC) 23, Gateway Mobile Switching Center (GMSC) 24, Short Message Service GMSC (SMS-GMSC) 25, Short Message Service Interworking MSC (SMS-IWMSC) 26, Visitor Location Register (VLR) 27, Home Location Register (HLR) 28, Interworking Location Register (ILR) 29, Authentication Center (AUC) 31, and Base Station Controller (BSC) 32. The GSM STE 22 includes simulations of the following network nodes: Equipment Identity Register (EIR) 33, Base Transceiver Station (BTS) 34, and Mobile Station (MS) 35 with SIM card 35a.

Table 1 below is a list of the nodes within the GSM Switching System (SS) and Base Station Subsystem (BSS). The table also indicates the UNIX tool emulating each specific node. The UNIX tools are utilized to interconnect the nodes to a GSM network.

TABLE 1

| NODE | FULL NODE NAME | MODE(S) | UNIX TOOL |
| --- | --- | --- | --- |
| MSC | Mobile Switching Center | Emulated | AXE-emulator |
| GMSC | Gateway Mobile Switching Center | Emulated | AXE-emulator |
| SMS-GMSC | Short Message Service GMSC | Emulated | AXE-emulator |
| SMS-IWMSC | Short Message Service Interworking MSC | Emulated | AXE-emulator |
| VLR | Visitor Location Register | Emulated | AXE-emulator |
| HLR | Home Location Register | Emulated | AXE-emulator |
| ILR | Interworking Location Register | Emulated | AXE-emulator |
| AUC | Authentication Center | Emulated | AXE-emulator |
| EIR | Equipment Identity Register | Simulated | RPX-simulator |
| BSC | Base Station Controller | Emulated | AXE-emulator |
| BTS | Base Transceiver Station | Simulated | RPX/CENTS |
| MS | Mobile Station | Simulated | CENTS |

Most of the core GSM network nodes are based on specific manufacturer hardware switches such as the Ericsson AXE. All AXE-based nodes, therefore, are emulated for OSI layer 3 and above. Other nodes are simulated completely.

The GSM network STE 22 can be connected to several service nodes. The service nodes include: SMS Message Center (MXE) 36, Service Control Point (SCP) 37, Service Order Gateway (SOG) 38, Billing Gateway (BGW) 39, Serving GPRS Support Node (SGSN) 41, and Operation and Maintenance Center (OMC) 42.

Table 2 below is a list of the external service nodes to which the GSM network STE interfaces, along with an indication of the signaling interface and gateway node for each service node.

TABLE 2

| NODE | FULL NODE NAME | SIGNALING INTERFACE | GATEWAY NODES |
|---|---|---|---|
| MXE | SMS Message Center | Signaling System 7 (SS7) | MSC |
| SCP | Service Control Point | SS7 | MSC |
| SOG | Service Order Gateway | X.25 | MSC |
| BGW | Billing Gateway | X.25 | MSC |
| SGSN | Serving GPRS Support Node | SS7 | MSC/BSC |
| OMC | Operation and Maintenance Center | X.25 | MSC, HLR, AUC, EIR, BSC |

The GSM network STE 22 can also be connected to several other telecommunication systems and networks such as other Public Land Mobile Networks (PLMN) (e.g., D-AMPS, PDC, etc.) 43, the Public Switched Telephone Network (PSTN) 44, the Integrated Services Digital Network (ISDN) 45, the Circuit Switched Public Data Network (CSPDN) 46, the Packet Switched Public Data Network (PSPDN) 47, the Digital European Cordless Telecommunications system (DECT) 48, the Global and Regional Satellite Communication System (GSM-S) 49, and the GSM-Railway System (GSM-R) 50.

TABLE 3

| NETWORK/ SYSTEM | DESCRIPTION | SIGNALING INTERFACE | GATEWAY NODES |
|---|---|---|---|
| PLMN | Other Public Land Mobile Networks (e.g., D-AMPS, PDC, etc.) | SS7 | GMSC |
| PSTN | Public Switched Telephone Network | SS7 | GMSC |
| ISDN | Integrated Services Digital Network | SS7 | GMSC |
| CSPDN | Circuit Switched Public Data Network | SS7 | GMSC |
| PSPDN | Packet Switched Public Data Network | SS7 | GMSC |
| DECT | Digital European Cordless Telecommunications | SS7 | GMSC, MSC |
| GSM-S | Global and Regional Satellite Communication System | SS7 | GMSC, MSC |
| GSM-R | GSM-Railway System | SS7 | GMSC |

Table 3 above is a list of telecommunication systems and networks to which the GSM network STE 22 interfaces, along with an indication of the signaling interface and gateway node for each telecommunication system and network. The interworkings between the GSM network and the other networks are found in the GSM specification.

Figure 3:
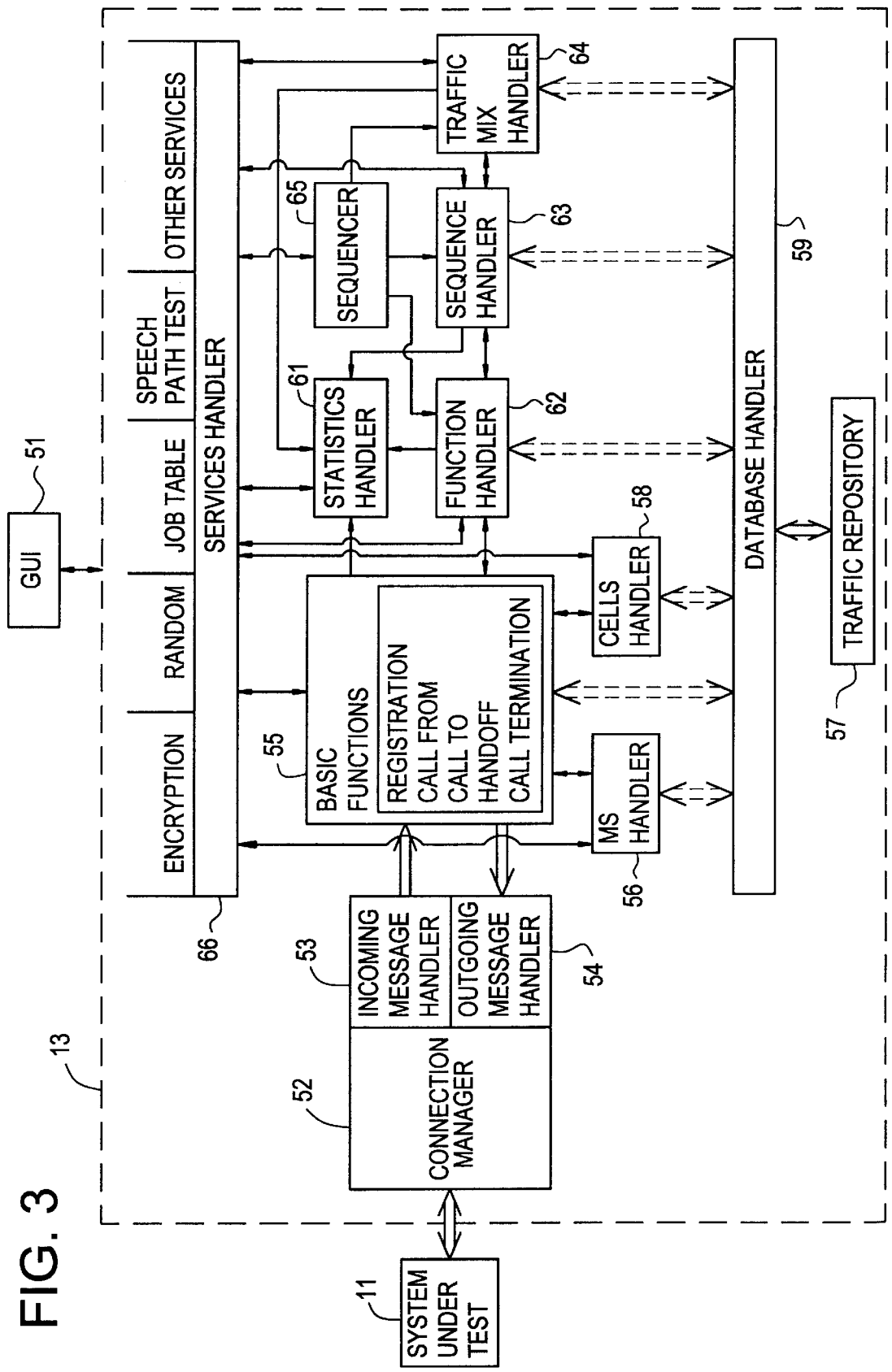
FIG. 3 is a block diagram of the preferred embodiment of the Cellular Network Traffic Simulator (CENTS)
Figure 5A:
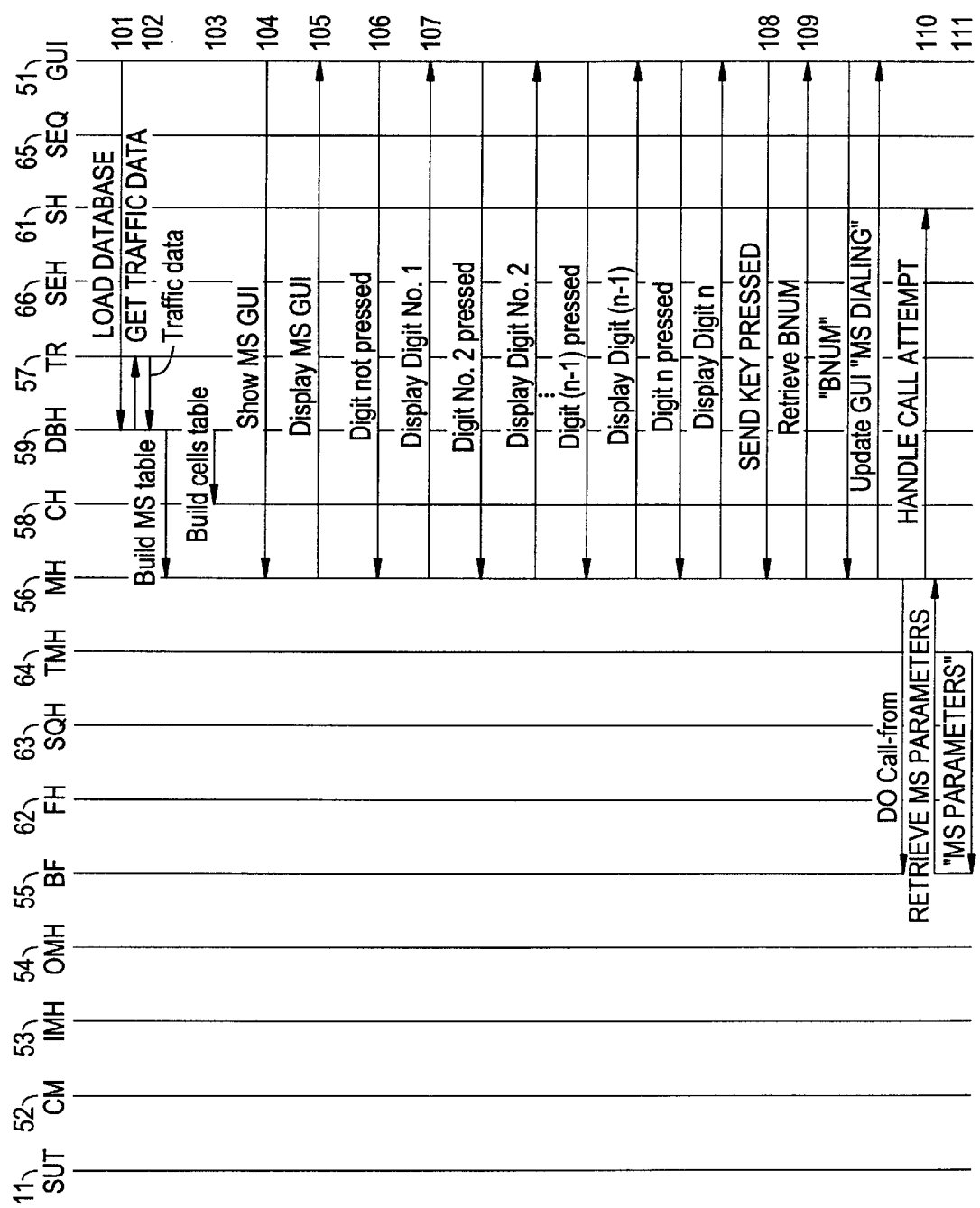
FIGS. 5A–5D are a message flow diagram illustrating the steps involved when generating a simulation of a MS-to-MS call interactively from the graphical user interface in accordance with the teachings of the present invention.
Figure 5B:
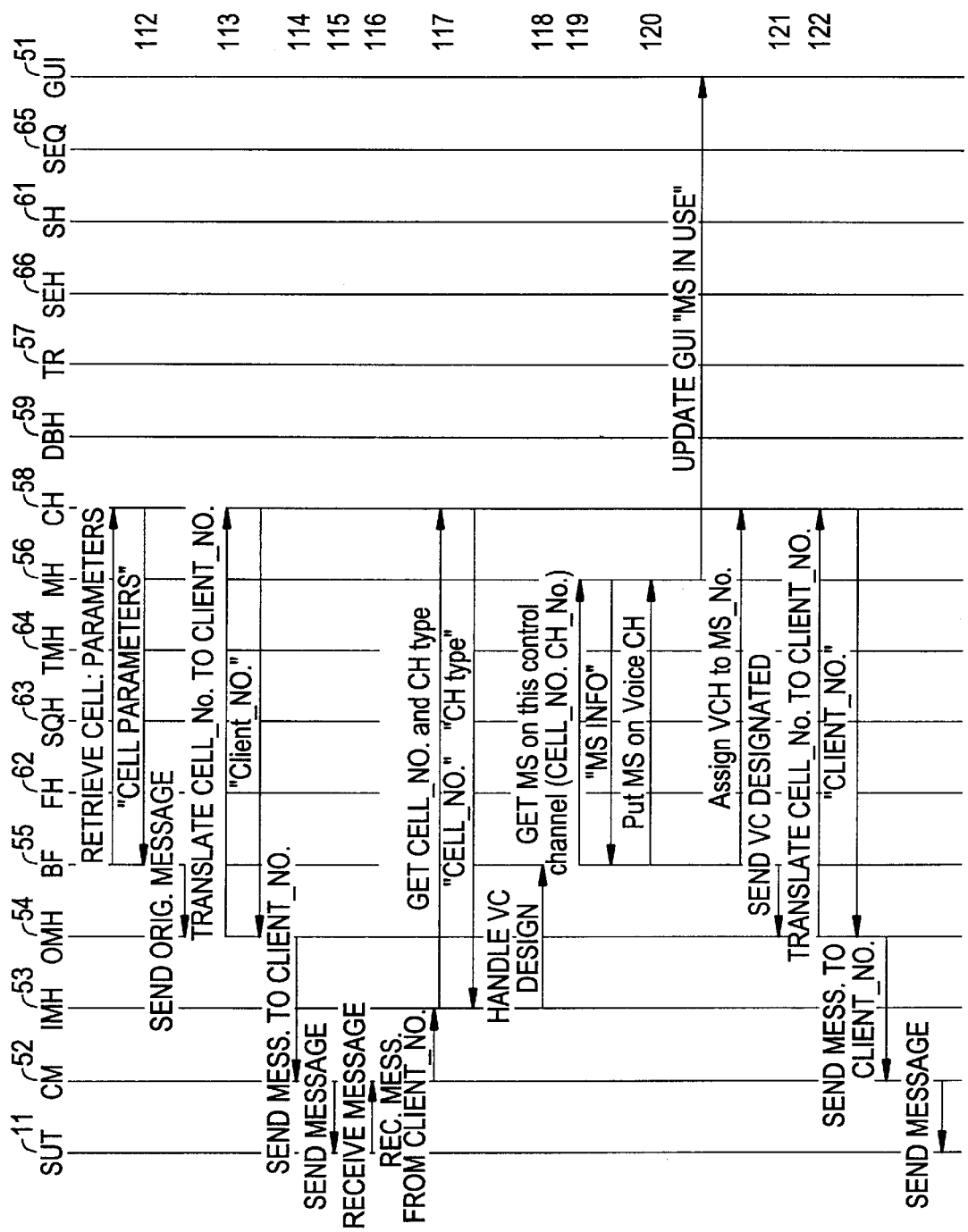
Figure 5C:
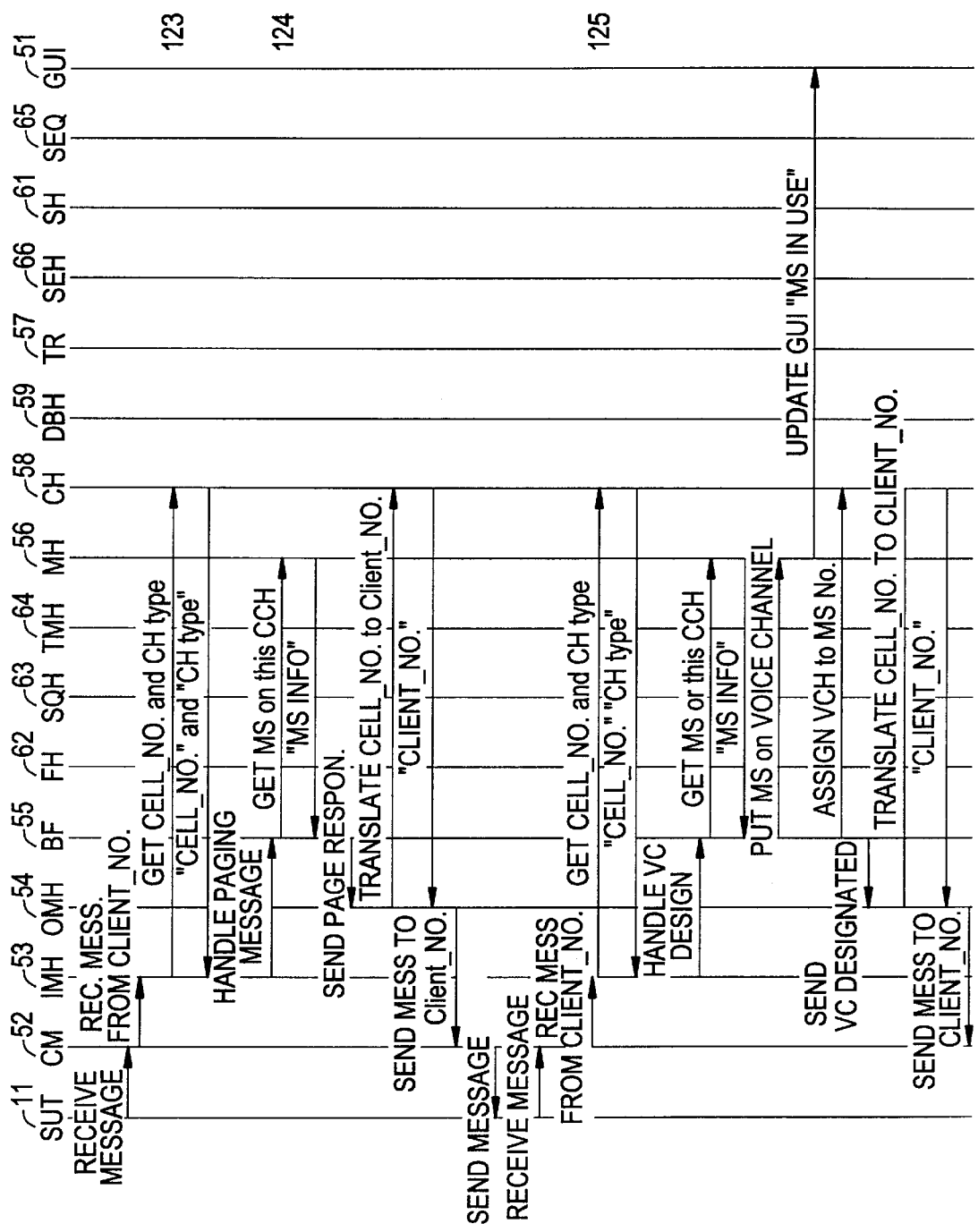
Figure 5D:
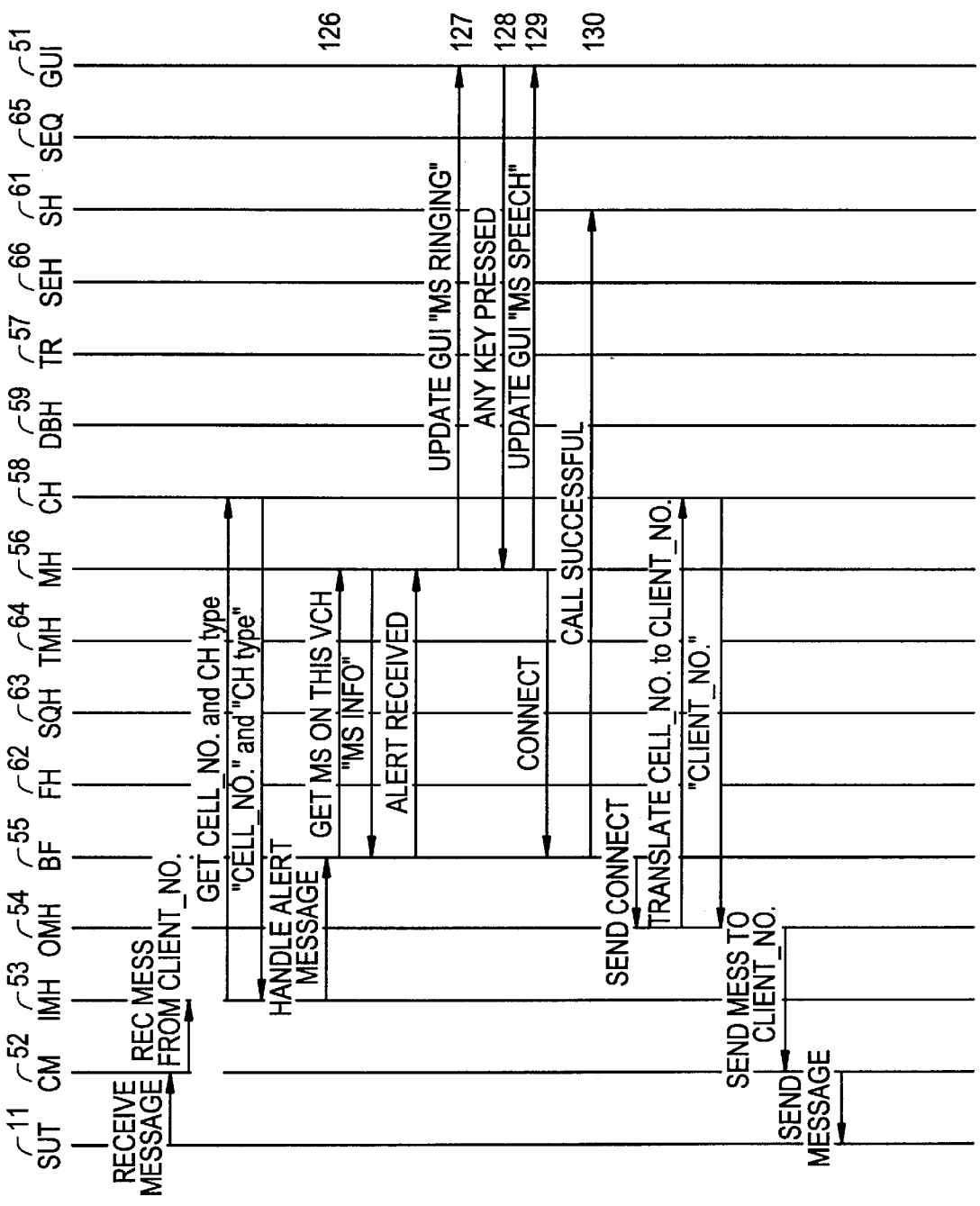

FIG. 3 is a block diagram of the preferred embodiment of the Cellular Network Traffic Simulator (CENTS) system 13 of FIG. 1. The CENTS system is a tool which reproduces Cellular Traffic in a customer-like environment by simulating mobile access to the system based on the applicable air interface specification (for example, IS-54, IS-136, GSM, Pacific Digital Cellular (PDC), etc.). The CENTS system is made of multiple modules interworking together to generate realistic traffic on the connected exchanges and/or real phones.

The user interfaces with the CENTS through a graphical user interface (GUI) 51. The GUI comprises a set of display windows with buttons, scroll bars, check boxes and related items utilized to interface with the CENTS system 13. The GUI is an entry point to generate events and/or modify the information stored in the different structures held in memory. The GUI can be used to monitor internal behavior, to request information to be stored on external media such as UNIX files, to initiate connection with other tools or drivers, and to configure the CENTS system from external files or databases. In the preferred embodiment, the GLI creates an on-display "virtual" mobile station (MS) window through which, by typing on an associated keyboard or selecting buttons on the displayed MS with a mouse's cursor, events may be generated just as a subscriber would use his actual mobile station.

A Connection Manager (CM) 52 controls an Incoming Message Handler (IMW 53 and an Outgoing Message Handler (OMH) 54 and interfaces with the system under test and other external programs. The CM establishes and maintains multiple connections to external tools and drivers. The CM enables the CENTS system to identify which entity it is communicating with, as well as to synchronize the communications between connected clients.

Referring briefly to FIG. 4, there is shown a simplified block diagram illustrating a plurality of external network configurations which may be tested with traffic generated by the CENTS system 13. First, real hardware in a D-AMPS cellular network can be connected to the CENTS system for testing. A mobile switching center (MSC) 71 is connected to a radio base station (RBS) 72 which utilizes a transceiver and antenna 73 to communicate with a real MS 74. The MS includes software which may connect to the CENTS system via a socket connection 75.

The CENTS system 13 may also be utilized to test hardware emulators and simulators in a D-AMPS simulated test environment (STE). A MSC emulator 76 is connected through an interface 77 to a RBS simulator 78. The RBS simulator, in turn, is connected to the CENTS system 13.

Real hardware in a GSM cellular network can also be connected to the CENTS system for testing. A mobile switching center (MSC) 79 is connected to a base station controller (BSC) 81 which, in turn, is connected to a base transceiver station (BTS) 82. The BTS utilizes an antenna 83 to communicate with a real MS 84. The MS includes software which may connect to the CENTS system via a socket connection 85.

Finally, FIG. 4 illustrates a configuration in which the CENTS system 13 is utilized to test emulated GSM hardware and GSM simulators in a GSM-STE. Emulator 86 is connected through an interface 87 to a BTS simulator 88. Emulator 86 is also connected through an interface 89 to a second emulator 91. The second emulator is connected through an interface 92 to a BTS simulator 93. The BTS simulator, in turn, is connected to the CENTS system 13.

The system can also use a real MS with a simulated MSC, a simulated MS with a real MSC, or a simulated MS with a simulated MSC. SIM modules 94 and 95 are utilized to implement a SIM card as used in GSM mobile stations. The SIM modules complement the MS Handler 56.

Referring again to FIG. 3, the IMH 53 is responsible for routing incoming messages to the appropriate function in the Basic Functions block 55. The IMH does not discern the content of incoming messages, but determines only the message type and the destination.

The Basic Functions (BF) block 55 includes the basic functions outlined in the air interface specification which MSs can perform to trigger events in the cellular network. All MSs operate under standards which define the operations which the MSs can perform. The only thing that varies between calls is the parameters of the call. The sequences of events is defined in the air interface standard, and is always the same. In IS-136, for example, some of the basic functions include Registration, Call From, Call To, Handoff, and Call Termination, etc. IS-136 and IS-54 are hereby incorporated by reference herein. The CENTS system uses generic software units (basic functions) coding the air interface standard and then applies them whenever traffic is added.

An operator can also program different MS characteristics into the traffic mix generated by the CENTS system. In real life, not all MSs perform up to the specifications all the time. The CENTS system can test the response of the system to out-of-spec MSs. In addition, when new versions of the air interface specification come out, there are at that time no actual MSs that perform in accordance with the specification. MSs meeting these new specifications can be programmed in to test the system even before the new MSs actually exist.

The basic functional blocks required to build a real call case include:

1. Generic call routines (basic functions from the air interface specification);
2. A MS Database containing programmable MS parameters;
3. A cell database containing programmable radio parameters (for example, signal strength, BER, propagation conditions, etc.); and
4. Unique call cases (programmable call actions). Programmable call actions may include, for example, a call of a defined duration, which changes to a three-party call, and is then interrupted with a call-waiting in the middle.

Each basic function is the implementation of a certain MS call scenario as described in the supported Air Interface Specification. The basic functions are the building blocks of all possible call scenarios. Examples of basic functions include Registration of a MS (D-AMPS) and Location Update of a MS (GSM). The BF 55 performs the following functions:

Extracting information from incoming messages;
Maintaining the BF internal structure for its progress through the coded state machine;
Requesting, when necessary, the MS Handler (MH) 56 and/or the Cells Handler (CH) 58 to refresh the GUI 51 with later stored information;
Modifying the MS and CELLS internal structures accordingly;
Informing the Sequence Handler (SH) 63 and/or the Function Handler (FH) 62 of the occurrence of predefined trigger events;
Invoking necessary services from the SH 63 for timing; and
Building the outgoing messages which are sent to the OMH 54.

The OMH 54 is responsible for interfacing the Basic Functions block 55 with external programs connected on the CM 52 which encapsulates the outgoing messages according to the protocol defined for each connection in the OMH 54. The possible APIs for each connection are stored in the CM.

A Mobile Station Handler (MH) 56 handles all events generated from the MS window part of the GUI 51. The MH includes an internal state machine of a MS of any type, and is programmable to account for MSs with enhanced features such as fax and data capabilities. The MH updates the MS GUI when basic functions are performed so that the user receives actual indications on the displayed MS that would be generated by a real cellular network. The MH maintains the mobile structure of the defined MS since all MSs can be modified to behave in accordance with the user's requests and/or requests generated from a Traffic Repository database 57.

A Cells Handler (CH) 58 maintains cell structure that can be upgraded as requested by a user from the GUI 51, a Database Handler (DBH) 59, and signals coming from the IMH 53. The CH contains information relating to usage of control channels and traffic channels in the cellular network. This enables an operator to determine where MSs are registered, and which voice channels they are using. The CH can display its internal structure on the GUI 51 for information, and accept event requests to modify the structure. The CH also includes parameters relating to base station transmitter power and radio propagation conditions, both of which can be changed by the operator through the GUI 51.

The Database Handler (DBH) 59 maintains the Traffic Repository 57. The traffic repository stores and plays back actual recorded mobile traffic, and can be stored either in memory "within CENTS" or on an external media such as a unit file read by the DBH. The DBH can be ordered to save or restore the internal structures of information, such as in the mobile station database (MS DB) and the cell database (CELL DB), to or from external repository.

A Statistics Handler (SH) 61 gathers and compiles all statistical information submitted by traffic entities such as the Basic Functions 55, a Function Handler (FH) 62, a Sequence Handler (SQH) 63, and a Traffic Mix Handler (TMH) 64 based on predefined trigger events. The SH 61 compiles counts of various events generated by the CENTS system for use by the system operator. The SH 61 can be requested to output all or some of its content to the GUI 51, to an external file, or to any external devices such as printers and plotters. Typically, the SH maintains statistical information on a set of counters for success, failure, or timeout of traffic cases, as defined in the submitting modules.

The Function Handler (FH) 62 attaches parameters to the Basic Functions used, in order to enable a particular MS to perform actions within the connected network of cells (for example, Registration of MS-X in Cell-Y). An operator can create, start, stop, modify and remove functions through requests to the FH. The FH can request the services of the Services Handler (SEH) 66 to simulate real time behavior. The FH can also report statistics to the SH 61 during execution of predefined trigger events such as function failure. The operator can modify the real time behavior of the functions through a Sequencer (SEQ) 65 through the GUI 51. The FH 62 is responsible for maintaining the function internal structure. The FH is responsible for monitoring ongoing basic functions, and informing its related parent module, the Sequence Handler (SQH) 63, of the occurrence of any predefined trigger events. The SQH receives indications from the FH that trigger events have occurred, and performs defined actions such as starting the next basic function.

The Sequence Handler (SQH) 63 maintains its internal structure for the execution (start/stop), creation, modification, and deletion of traffic sequences. Basic functions from the BF 55 are utilized in the FH 62 to create functions which, in turn, are utilized in the SQH 63 to create the sequences. Thus, each sequence is made out of predefined functions stored within the function structure maintained by the FH 62. The SQH 63 verifies that the generated sequence of events is consistent with air interface requirements and is logical. For example, a generated sequence cannot end a call before the call has begun. For example, a generated sequence may follow:

SEQ[1]=FUN[1]<=>BF[2] Registration of MS-1 in MTLA); FUN [5]<=>BF[8] (Registration of MS-3 in TRVH); FUN[7]<=>BF [6] (Call From MS-1 to MS-3).

The SQH 63 reports its statistics to the SH 61 at runtime.

Each sequence can be defined to execute all its designated functions in a row regardless of their return value, or to continue to the next function in the sequence only if the previous function has been successfully completed. At runtime, the SH 61 can request services from the SEH 66 in order to simulate random behavior and/or real time behavior. The SQH is responsible for informing its parent module, the Traffic Mix Handler (TMH) 64, of the occurrence of predefined trigger events such as the completion of a sequence. The TMH receives indications from the SQH that trigger events have occurred, and performs defined actions such as starting the next sequence.

The Traffic Mix Handler (TMH) 64 maintains the traffic mix internal structure for starting or stopping traffic, or for creating, deleting or modifying traffic. The TMH is an overall manager which controls the entire traffic load by managing the SQH 63. Each Traffic Mix is constructed from a number of sequences for which random and real time behavior can be generated by using services from the SEH 66. For example:

TFM[5]=SEQ[2], SEQ[5], SEQ[10]

The TMH reports statistical information to the SH at runtime for predefined trigger events to update counters. The TMH is responsible for monitoring the notification from the SQH at runtime. For example, a traffic mix may be configured to stop generating a massive amount of calls if a predefined threshold of call-sequence failures has been reached.

The sequencer (SEQ) 65 is responsible for altering the real time behavior of the Function Handler (FH) 62, Sequence Handler (SQH) 63, and Traffic Mix Handler (TMH) 64 traffic modules. For example, the sequencer may be requested to speed up or slow down the registration of 100 mobile subscribers. Thus, the SEQ 65 controls the rate at which functions, sequences, and traffic mix are launched. The SEQ may be controlled through the GUI using, for example, a slider.

A Services Handler (SEH) 66 provides a set of services to the CENTS modules. The services supported by the SEH include encryption/decryption, random number generation, job table, speech path test, authentication, and other services. New services can easily be added to the SEH set of services as required.

Encryption/Decryption

This service is used, for example, during the authentication process of a mobile subscriber.

Random NB Generator: This service is used to obtain a random value within a certain range and precision. (Ex: signal strength 0 dB to 15 dB±1 dB).

Job Table: This service is used to time-delay events of any type. (Ex: Notify the SH in 15 sec.) This module supports insertion and deletion of jobs within its internal structure.

In an Interactive Mode (IM), the CENTS system can be controlled from a pipe by an external tool in order to configure it and automatically connect it with other tools prior to manual access by an operator. In this way, a complete network can be built and interconnected before a tester/user accesses the CENTS system. In a Command Line Interface (CLI) mode, the CENTS system can be quickly started in a predefined configuration by invoking the system with arguments. For example, an operator may request the system to display its current version with a "CENTS-ver" command from the command line of a console/command tool.

FIGS. 5A–5D are a message flow diagram illustrating the steps involved when generating a simulation of a MS-to-MS call interactively from the graphical user interface in accordance with the teachings of the present invention. With reference to FIGS. 3 and 5A–5D, the operation of the CENTS system will now be explained. In FIG. SA, step 101, event "LOADDATABASE" is generated from the GUI 51 towards the Data Base Handler (DBH) 59. The DBH parses the provided database for known sectors and invokes the associated data structure owning modules. In step 102, the mobile station sector is found, and the Mobile Station Handler (MH) 56 is ordered to build the MS structure. In step 103, the Cells sector is found, and the Cells Handler (CH) 58 is ordered to build the cell structure. In step 104, event "Show MS" is generated from the GUI towards the MH 56. The MH then fetches the MS-related information for each selected individual from an MS table (for example, subscriber number, serial number, and protocol type). In step 105, the MH orders the GUI to generate a predefined MS window display using the information fetched in step 104.

In step 106, event "Digit No. 1" is generated from the GUI toward the MH. In step 107, the MH orders the GUI to display the pressed digit on the associated MS window. In step 108, event "SEND" is generated from the GUI towards the MH. The MH interrogates the MS table for the MS call-related data for the specified individual and evaluates what action to perform based on the internal state, protocol supported, etc. In the depicted scenario, the selected action is to perform an originating call access. In order to do so, the dialed telephone number (B-number) is needed. In step 109, the MH orders the GUI to the send the number dialed. Once received, the MH orders the GUI to update the display of the MS window to indicate dialing, and the MS state machine is updated accordingly. In step 110, the basic function (BF) corresponding to the action selected in step 108 is invoked using the MS identity. This is a predefined trigger event in the BF "Call-from," so the Statistics Handler (SH) 61 is informed that a call attempt is being made. In step 111, the BF 55 retrieves from the MH, the parameters necessary to perform an originating call access (such as SNB, SRNB, and CELLID). The method then moves to FIG. SB.

Using the CELLID, the BF 55 then retrieves the cell parameters from the CH 58 at step 112. The BF now has all the parameters needed to build an originating call access message, and the Outgoing Message Handler (OMH) 54 is thus ordered to send the message to the System Under Test (SUT) 11. In step 113, the OMH 54 orders the CH to perform a logical destination-to-physical destination (cell number-to-client number) translation. In step 114, the OMH orders the Connection Manager (CM) 52 to transmit the message on the designated socket. In step 115, the CM transmits the message to the SUT 11 on the selected socket using the appropriate protocol based on the connection type. In step 116, an incoming message from the SUT is detected by the CM and is decoded using the defined protocol. The Incoming Message Handler (IMW 53 is then ordered to forward this message to the appropriate BF.

In step 117, the IM requests a physical-to-logical (cell number and channel type) translation. In step 118, the IMH then parses the message in order to identify its type and its associated BF. Here the message type is identified as being a voice channel designation order belonging to an originating call. The message is therefore forwarded to the BF "Call-from". In step 119, the BF "Call-from" then retrieves from the MH 56, all mobile stations currently tuned to this control channel with matching MS identification parameters. In step 120, the BF "Call-from" updates its internal states accordingly, and then orders the MH to tune the MS to the designated voice channel. The MH then orders the GUI 51 to update the display of the MS window with "IN USE". In step 121, the BF "Call-from" orders the CH 58 to assign the designated voice channel to this MS. The CH updates the cell structure accordingly. In step 122, the BF "Call-from" is complete with the voice channel designation, and a voice channel designation message is built for transfer to the SUT 11 through the OMH 54. The method then moves to FIG. 5C.

At step 123, an incoming message from the SUT 11 is detected by the CM 52 which forwards this message to the IMH 53 after protocol translation. The IMH requests a physical-to-logical (cell number and channel type) translation from the CH 58. The IMH then parses the message in order to identify its type and its associated BF. In this case, the IMH identifies this message as being a paging order, and the associated BF 55 as being "Call-to". In step 124, the BF "Call-to" orders the MH 56 to find all MSs currently tuned to this control channel with matching identification parameters. If found and in one of the allowed states, the BF "Call-to" builds a page response message and updates its internal states accordingly. It then orders the OMH 54 to transfer the message to the SUT 11.

In step 125, an incoming message is detected by the CM 52 which forwards it to the IMH 53 after protocol translation. The IMH requests a physical-to-logical (cell number and channel type) translation from the CH 58. The IMH then parses the message in order to identify its type and its associated BF. The IMH identifies this message as being a voice channel designation message belonging to a terminating call, and therefore the associated BF as being "Call-to". The BF "Call-to" then retrieves from the MH 56, all mobile stations currently tuned to this control channel with matching MS identification parameters. The BF "Call-to" updates its internal states accordingly, and then orders the MH to tune the MS to the designated voice channel. The MH then orders the GUI 51 to update the display of the MS window with "IN USE". The BF "Call-to" then orders the CH 58 to assign the designated voice channel to this MS. The CH updates the cell structure accordingly. A voice channel designation message is built for transfer to the SUT 11 with a logical destination-to-physical destination (cell number-to-client number) translation. The voice channel designation message is then sent through the OMH 54 and the CM 52 to the SUT 11. The method then moves to FIG. 5D.

At step 126, an incoming alert message is received through the CM 52 and the IMH 53. The IMH requests a physical-to-logical (cell number and channel type) translation from the CH 58. The IMH then parses the message in order to identify its type and its associated BF. The IMH identifies this message as being an alert message, and therefore the associated BF as being "Call-to". The BF 55 "Call-to" requests the CH 58 to send the identity of the MS currently tuned to this voice channel. After updating its internal state, the BF notifies the MH 56 that an alert message has been received. In step 127, the MH updates its state and orders the GUI 51 to update the MS widow display with the appropriate alert message for the MS type. In step 128, event "KEY PRESSED" is generated from the GUI towards the MH. In step 129, the MH evaluates the MS state and decides it is event CONNECT. The MH then orders the GUI to update the MS window display with an appropriate "In speech" message for the MS type. The MH then notifies the BF "Call-to" that a connect has been generated. In step 130, the BF "Call-to" notifies the SH 61 that a call has been completed successfully, and then builds a connect message for transfer to the SUT with a logical destination-to-physical destination (cell number-to-client number) translation. The connect message is then sent through the OMH 54 and the CM 52 to the SUT 11.

The CENTS system can also generate a traffic mix automatically rather than interactively through the graphical user interface. Table 4 below illustrates the components of an exemplary automatically generated traffic mix. The sequences within the traffic mix may be executed sequentially, randomly, upon the occurrence of specified trigger events, at specified absolute times (e.g., 12:00 p.m.), or at specified relative times (e.g., 10 seconds after a trigger event).

TABLE 4

| Layer | Designation | Description |
|---|---|---|
| Traffic Mix Layer | TM[1] | Randomly starts available sequences at a predefined time (e.g., 12:00 p.m.) MODE = SEQUENTIAL. |
| Sequence Layer | SEQ[1] | A complete MS[1] to MS[2] call comprising sequential functions F[1]–F[5]. F[2] is started if F[1] succeeded, F[3] if F[2] succeeded, etc. |
| | SEQ[2] | A complete MS[3] to M[4] call comprising sequential functions F[6]–F[10]. |
| Function Layer | F[1] | Registration of MS[1] in a random cell. Type of registration: Power up |
| | "COND1" | Timeout after 5 sec if no response from SUT. Succeed if right response received from SUT. Fail if wrong response received from SUT. |
| | F[2] | Same as F[1] but using MS[2] |
| | F[6] | Same as F[1] but using MS[3] |
| | F[7] | Same as F[1] but using MS[4] |
| | F[3] | Origination of a Call-from MS[1] with BSUB equal to MS[2] SNB. Uses COND1 principle. |
| | F[8] | Origination of a Call-from MS[3] with BSUB = MS[4] SNB. Uses COND1. |
| | F[4] | Check if MS[2] has been paged using COND1 |
| | F[9] | Check is MS[4] has been paged using COND1 |
| | F[5] | Accept the incoming call when MS[2] is "ringing" using COND1 (w/speech test) |
| | F[10] | Same as F[5] but using MS[4] (w/speech test) |
| Basic Function Layer | Registration | F[1], F[2], F[6], F[7] |
| | Call-from | F[3] and F[8] |
| | Call-to | F[4] and F[9] |
| | Connect | F[5] and F[10] |

Figure 6:
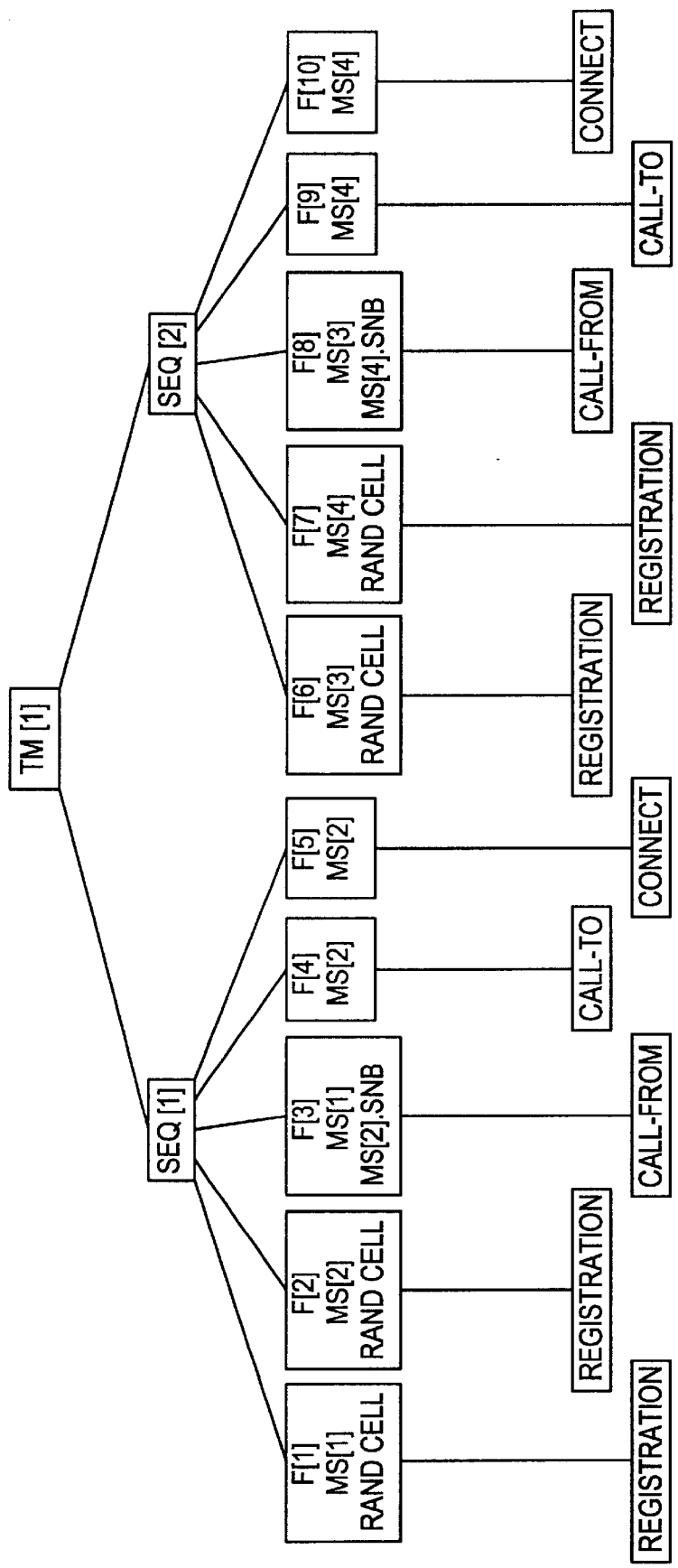
FIG. 6 is a block diagram illustrating the relationship between the traffic mix layer, the sequence layer, the function layer, and the basic function layer in the automatically generated traffic mix illustrated in Table 4.

FIG. 6 is a block diagram illustrating the relationship between the traffic mix layer, the sequence layer, the function layer, and the basic function layer in the automatically generated traffic mix of Table 4. The traffic mix TM[1] comprises two sequences, SEQ[1] and SEQ[2]. SEQ[1] is a complete MS[1] to MS[2] call comprising sequential functions F[1]–F[5]. F[2] is started if F[1] succeeded, F[3] if F[2] succeeded, etc. SEQ[2] is a complete MS[3] to MS[4] call comprising sequential functions F[6]–F[10]. F[7] is started if F[6] succeeded, F[8] if F[7] succeeded, etc.

Figure 7A:
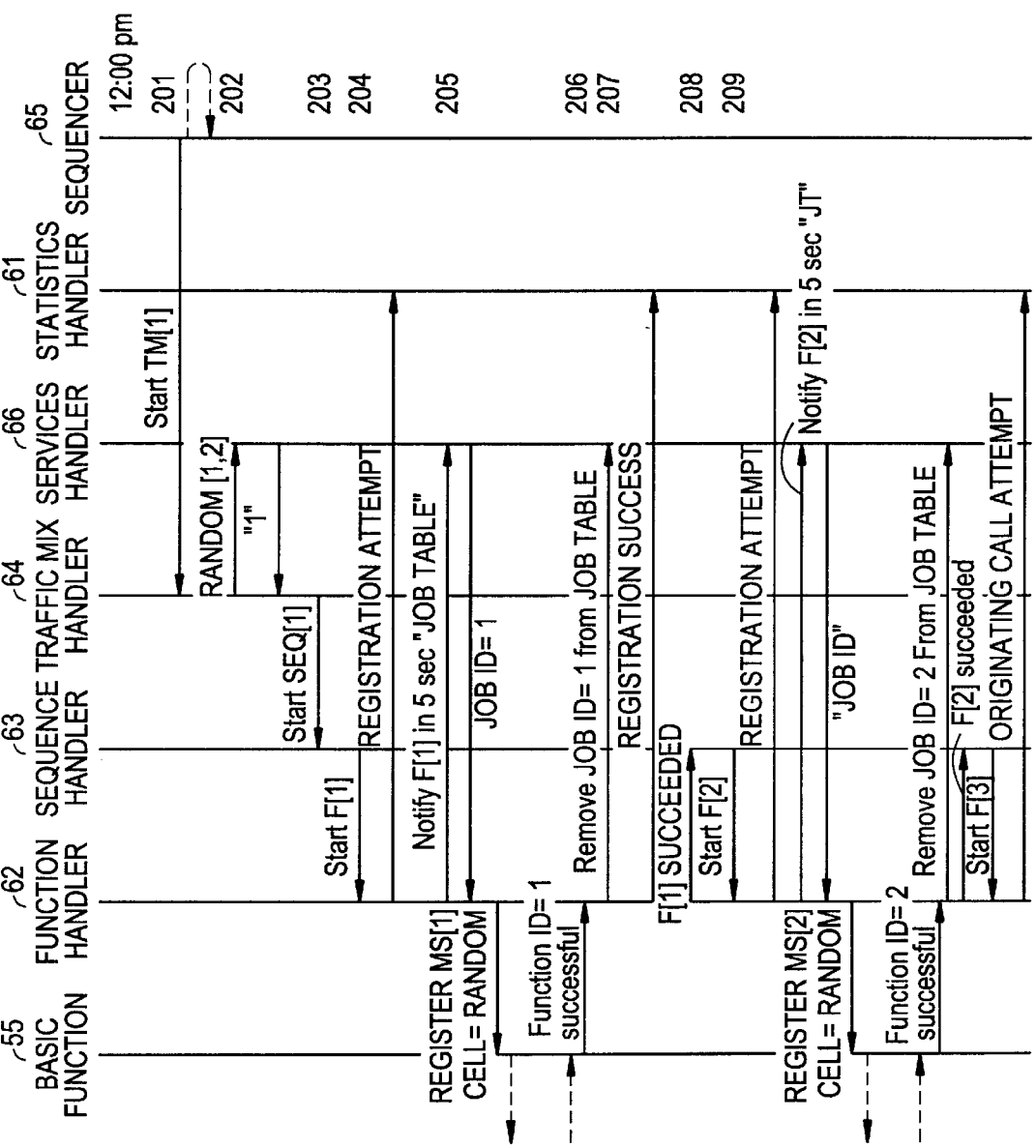
Figure 7C:
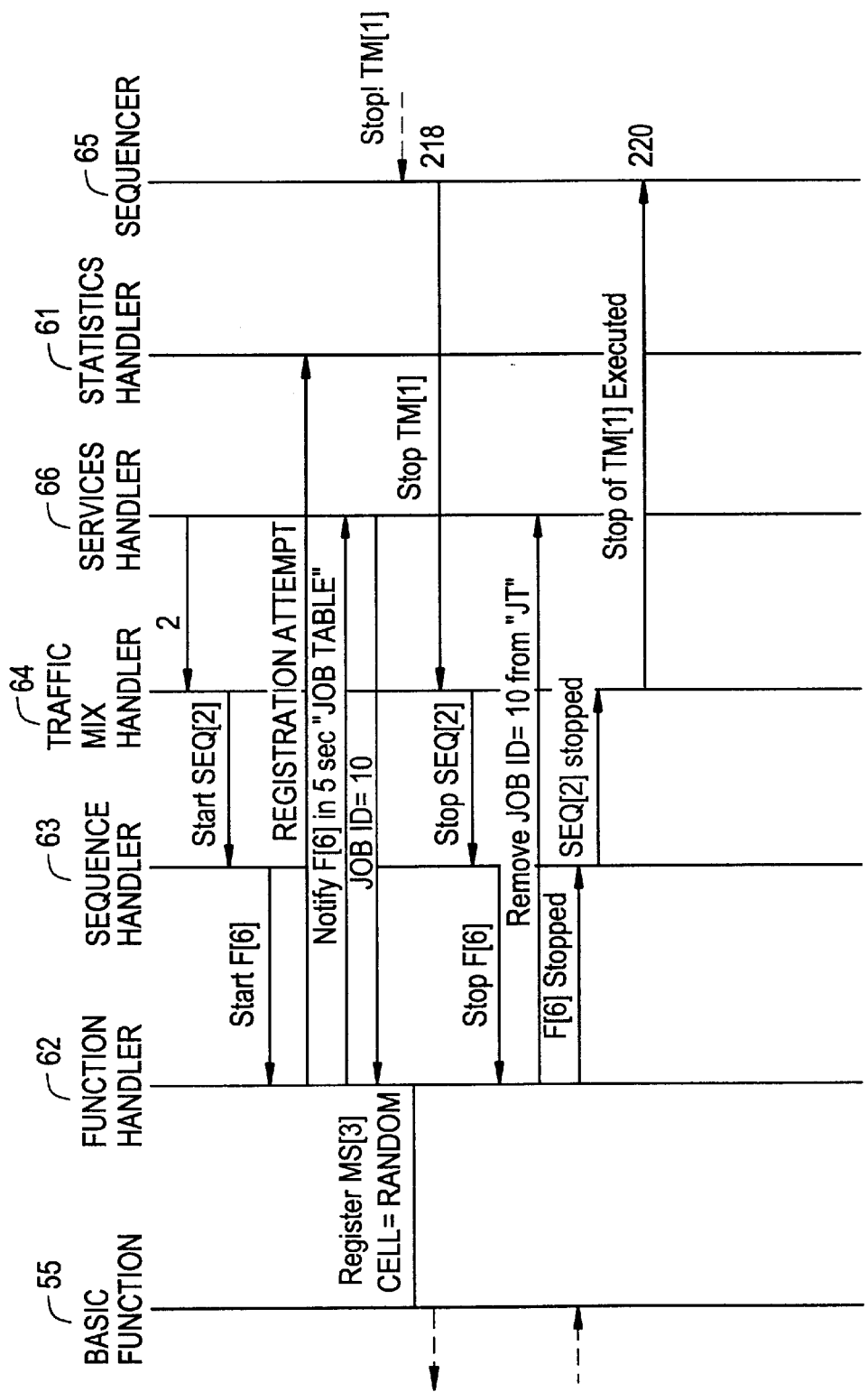

FIGS. 7A–7C are a message flow diagram illustrating the steps involved when the present invention automatically generates a traffic mix of MS-to-MS calls. In order to simplify the figure, several modules of the CENTS system have been removed. These modules are SUT, CM, IML OMF, MH, CH, TR, DBH, and GUI.

In FIG. 7A a user has ordered the Sequencer 65 to start traffic mix TM[1] at 12:00 p.m. through the GUI 51. The Sequencer utilizes the absolute time job table through the Services Handler 66 for this function. At 12:00 p.m. the Sequencer is notified by the Services Handler to begin. In step 201, the Sequencer orders the Traffic Mix Handler 64 to start TM[1]. In step 202, the Traffic Mix Handler analyzes the defined traffic mix that is defined as SEQ[1] or SEQ[2] randomly. To achieve this it invokes the random number generation service through the Services Handler which returns, for example, the number 1. In step 203, the Traffic Mix Handler 64 orders the Sequence Handler 63 to start SEQ[1], and updates its internal structure with TM[1] started. In step 204, the Sequence Handler analyzes the defined sequence and orders the Function Handler 62 to start the first defined function in SEQ[1] (i.e., F[1]), and updates its internal structure to keep track of the status of SEQ[1]. In step 205, the Function Handler invokes the relative job table to time-supervise the registration attempt prior to ordering the Basic Function 55 "Registration" to execute a registration. In step 206, the SUT 11 responds with a registration confirmation that triggers the Basic Function 55 to report a successful execution to the Function Handler 62. In step 207, the Function Handler then orders the Services Handler 66 to remove the job with ID=1 from the job table. The Function Handler then updates its internal structure accordingly. In step 208, upon completion of F[1], the Function Handler 62 reports a successful execution to the Sequence Handler 63. In step 209, the reception of a successful execution of F[1] triggers the Sequence Handler to order the Function Handler to start the next function defined in the SEQ[1] sequence (i.e., F[2]).

Function F[2] performs a registration of MS[2] in a random cell, and follows the same steps as the registration of MS[1]. The Function Handler 62 invokes the relative job table to time-supervise the registration attempt prior to ordering the Basic Function 55 "Registration" to execute a registration. The SUT 11 responds with a registration confirmation that triggers the Basic Function 55 to report a successful execution to the Function Handler 62. The Function Handler then orders the Services Handler 66 to remove the job with ID=2 from the job table. The Function Handler then updates its internal structure accordingly. Upon completion of F[2], the Function Handler 62 reports a successful execution to the Sequence Handler 63. The reception of a successful execution of F[2] triggers the Sequence Handler to order the Function Handler to start the next function defined in sequence SEQ[1] (i.e., F[3]).

Function F[3] is an originating call attempt from MS[1] to MS[2]. Referring to FIG. 7B, step 210, the Function Handler 62 starts a Call-from type of basic function by giving the Basic Function 55 the MS[1] ID, a called subscriber designation (BSUB) corresponding to the subscriber number (SNB) of MS[2], and its Function ID. In step 211, upon successful voice channel designation for MS[1], the Basic Function informs the Function Handler of a success for function F[3]. Job ID=3 is then removed from the job table. In step 212, the Function Handler 62 starts function F[4] which is a Call-to for MS [2] to verify that MS[2] gets paged and receives a voice channel designation. In step 213, it is verified that MS[2] got paged and obtained its voice channel, therefore the Basic Function informs the Function Handler 62 of the success of function F[4]. Job ID=4 is then removed from the job table. In step 214, the Function Handler 62 starts function F[5] which is a Connect MS[2] with speech path test as predefined in function F[5]. The basic function Connect consists of a check that MS[2] has been alerted of an incoming call and accepts it (connects) upon reception. The speech path test implies that after the connection, the Basic Function 55 initiates a validation of the speech path by making use of the "Speech path test" services of the Services Handler 66.

In step 215, the target MS[2] has been alerted, and the basic function Connect has connected MS[2] by acknowledging the alert message. The Basic Function 55 then informs the Function Handler 62 that function F[5] was successful. Job ID=5 is then removed from the job table. Since speech path test is flagged on, the Function Handler must wait for the speech path test to be confined before reporting the success of function F[5] to the Sequence Handler 63. In step 216, the Basic Function 55 is using the Speech Path Test service of the Services Handler 66 in order to validate the communication path between MS[1] and MS[2]. In step 217, the Speech Path verification succeeds, and the Basic Function reports a success of function F[5] to the Sequence Handler. Function F[5] is the last function in SEQ[1], therefore the success of function F[5] triggers the Sequence Handler 63 to terminate and in turn, report a success of SEQ[1] to the Traffic Mix Handler 64. Thereafter, the Traffic Mix Handler again randomly selects one of the two sequences of TM[1]. The method then moves to FIG. 7C.

In FIG. 7C, the Services Handler may return for example, the random number 2, in which case, the Traffic Mix Handler starts sequence SEQ[2]. The procedure of implementing SEQ[2] is similar to SEQ[1] as the sequence steps sequentially through F[6] to F[10]. However, in step 218, the Sequencer 65 is ordered to stop TM[1] during F[6]. The Sequencer orders the Traffic Mix Handler 64 to terminate TM[1]. This order cascades down to the children of TM[1] that are currently being executed. Thus, the Traffic Mix Handler orders the Sequence Handler 63 to stop sequence SEQ[2]. The Sequence Handler, in turn, orders the Function Handler 62 to stop function F[6]. The acceptance or rejection of the registration of MS[3] is ignored since F[6] has been stopped. In step 219, the last job for SEQ[2] in the job table (ID=10) is removed from the job table. In step 220, the Sequencer 65 is informed that its request for stopping TM[1] has been executed.

It is thus believed that the operation and construction of the present invention will be apparent from the foregoing description. While the method and system shown and described has been characterized as being preferred, it will be readily apparent that various changes and modifications could be made therein without departing from the spirit and scope of the invention as defined in the following claims.

What is claimed is:

1. A traffic simulator for generating network traffic loads for a system under test in a cellular radio telecommunications network, the traffic simulator comprising:

a mobile station handler, the mobile station handler comprising:
at least one mobile station state machine; and
a database of mobile station properties;

a function handler connected to the mobile station handler, the function handler initiating execution of a plurality of basic functions, said basic functions comprising functions performed by mobile stations over an air interface link with the cellular network, the function handler attaching parameters corresponding to the mobile station's properties to the basic functions;

a sequence handler utilizing the basic functions with attached parameters to generate a plurality of call sequences consistent with air interface link requirements;

a traffic mix handler utilizing the plurality of call sequences to generate an overall network traffic mix for the system under test; and a connection manager interfacing with the system under test of the cellular network for applying the generated network traffic mix to the system under test.

2. The traffic simulator of claim 1 wherein the function handler includes means for initiating execution of a plurality of basic functions utilized in a Global System for Mobile Communications (GSM) network.

3. The traffic simulator of claim 2 wherein the mobile station handler further comprises a virtual SIM card that contains subscriber-specific data.

4. The traffic simulator of claim 2 wherein the connection manager includes means for receiving and processing GSM system information messages.

5. The traffic simulator of claim 1 wherein the function handler includes means for initiating execution of a plurality of basic functions utilized in an Advanced Mobile Phone System (AMPS/D-AMPS) network.

6. The traffic simulator of claim 1 wherein the function handler includes means for initiating execution of a plurality of basic functions utilized in a Pacific Digital Cellular (PDC) network.

7. The traffic simulator of claim 1 wherein the basic functions include:
   Registration;
   Call From;
   Call To;
   Handoff; and
   Call Termination.

8. The traffic simulator of claim 1 wherein the database of mobile station properties includes parameters relating to mobile station transmitter power for each mobile station.

9. The traffic simulator of claim 1 wherein comprising a cells handler which comprises:
   a database of cells in the network; and
   parameters relating to radio conditions.

10. The traffic simulator of claim 9 wherein the database of cells in the network includes information relating to channel usage in the network.

11. The traffic simulator of claim 9 wherein the parameters relating to radio conditions includes:
   parameters relating to base station transmitter power; and
   parameters relating to radio propagation conditions.

12. The traffic simulator of claim 1 further comprising a traffic repository which injects recorded real mobile station traffic into the traffic mix.

13. The traffic simulator of claim 1 further comprising a services handler which provides a set of services to the traffic simulator.

14. The traffic simulator of claim 13 wherein the set of services includes:
   encryption and decryption services;
   random number generation services to obtain a random value within a certain range and precision;
   authentication; and
   job table services to time-delay events of any type.

15. The traffic simulator of claim 1 further comprising a graphical user interface (GUI) which enables an operator to interface with the traffic simulator.

16. The traffic simulator of claim 15 wherein the GUI includes a set of display windows with buttons, scroll bars, and check boxes which enable the operator to inject events into the simulator, reset parameters affecting mobile stations and cells, obtain information regarding the generated traffic mix, monitor internal behavior, request information to be stored on external media, initiate connections with other tools and drivers, and configure the traffic simulator from external files or databases.

17. The traffic simulator of claim 1 further comprising means for sending the traffic mix to external network components, including means for sending the traffic mix as standardized air interface traffic signals.

18. The traffic simulator of claim 17 wherein the means for sending the traffic mix to external network components includes means for sending the traffic mix to both real and emulated network components.

19. A traffic simulator for generating traffic a cellular radio telecommunications network comprising:
   a function handler which initiates execution of a plurality of basic functions, said basic functions comprising functions performed by mobile stations over an air interface link with the network;
   a sequence handler which utilizes the basic functions to generate a plurality of call sequences;
   a traffic mix handler which utilizes the plurality of call sequences to generate an overall traffic mix;
   a mobile station handler which interfaces with the basic functions and comprises:
   a plurality of mobile station state machines for different types of mobile stations; and
   a database of mobile station properties; a cells handler which interfaces with the basic functions and comprises:
   a database of cells in the network; and
   parameters relating to radio conditions;
   a connection manager which sends the generated traffic mix to a network component of the cellular radio telecommunications network; and
   a graphical user interface (GUI) which enables an operator to interface with the traffic simulator.

20. The traffic simulator of claim 19 further comprising a traffic repository of recorded real mobile station traffic which is injected into the traffic mix.

* * * * *

UNITED STATES PATENT AND TRADEMARK OFFICE
CERTIFICATE OF CORRECTION

PATENT NO. : 6,272,450 B1
DATED : August 7, 2001
INVENTOR(S) : Hill et al.

It is certified that error appears in the above-identified patent and that said Letters Patent is hereby corrected as shown below:

Column 6,
Line 18, delete "(IMW" and substitute -- (IMH) -- therefor.

Column 10,
Line 13, delete "SA" and substitute -- 5A -- therefor.
Line 48, delete "SB" and substitute -- 5B -- therefor.
Line 63, delete "(IMW" and substitute -- (IMH) -- therefor.

Signed and Sealed this

Fifteenth Day of January, 2002

Attest:

JAMES E. ROGAN
*Director of the United States Patent and Trademark Office*

*Attesting Officer*